United States Patent
Markusch et al.

(10) Patent No.: US 6,403,702 B1
(45) Date of Patent: Jun. 11, 2002

(54) DIURETHANE PLASTICIZER CONTAINING ONE-SHOT POLYURETHANE CAST ELASTOMERS

(75) Inventors: Peter H. Markusch, McMurray, PA (US); Richard S. Pantone, New Martinsville, WV (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/453,678

(22) Filed: Dec. 3, 1999

(51) Int. Cl.[7] .............. C08J 3/00; C08K 3/20; C08L 75/00; C08G 18/00
(52) U.S. Cl. ............ 524/590; 524/198; 524/199; 524/589; 524/591; 524/839; 524/840; 528/44; 528/69
(58) Field of Search ................ 524/589, 590, 524/591, 839, 840, 198, 199; 528/44, 69

(56) References Cited

U.S. PATENT DOCUMENTS

| 4,123,413 A | 10/1978 | Mark et al. .......... 260/32.6 NR |
| 4,482,408 A | 11/1984 | Stephens et al. ............ 149/19.4 |
| 4,524,102 A | 6/1985 | Hostettler ................ 428/318.8 |
| 4,824,888 A | 4/1989 | Emmerling et al. ......... 524/199 |
| 5,525,654 A | 6/1996 | Podola et al. ................ 524/199 |
| 5,535,654 A | 7/1996 | Niesporek et al. ............ 83/364 |

OTHER PUBLICATIONS

Patent Abstracts of Japan, vol. 2000, No. 07, Sep. 29, 2000, & JP 2000 119390 A (The Yokohama Rubber Co Ltd, Apr. 25, 2000 abstract.

*Primary Examiner*—Patrick D. Niland
(74) *Attorney, Agent, or Firm*—Joseph C. Gil; N. Denise Brown

(57) ABSTRACT

This invention relates to a process for the preparation of one-shot polyurethane cast elastomers containing liquid, diurethane non-migrating plasticizers. This process comprises reacting via the one-shot process an organic diisocyanate, an isocyanate-reactive component, and at least one crosslinking agent in the presence of a liquid, diurethane plasticizer.

25 Claims, No Drawings

DIURETHANE PLASTICIZER CONTAINING ONE-SHOT POLYURETHANE CAST ELASTOMERS

BACKGROUND OF THE INVENTION

This invention relates to a process for the preparation of one-shot polyurethane cast elastomers containing liquid, diurethane non-migrating plasticizers. This process comprises reacting via the one-shot process an organic polyisocyanate, an isocyanate-reactive polyol component, and at least one chain extender and/or crosslinking agent in the presence of a liquid diurethane plasticizer.

Plasticizers are generally used in plastics (i.e., PVC) to adjust hardness, flexibility, and processing characteristics. Plasticizers are also used in some commercial polyurethane elastomer formulations to provide products exhibiting higher flexibility, lower hardness, and lower rebound resulting in increased energy absorption. However, these products can potentially embrittle over time due to migration of the plasticizer. Plasticizers that have a minimal effect on hardness and physical properties, and which are non-migrating are desirable for polyurethane elastomers prepared by a one-shot cast elastomer process.

Diurethanes are known and described as suitable stabilizing additives for sealing compounds in, for example, U.S. Pat. No. 4,824,888 and as plasticizers for polyurethane based sealing and adhesive compositions in U.S. Pat. No. 5,525,654.

U.S. Pat. No. 4,824,888 discloses diurethanes corresponding to one of the general formulas:

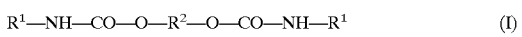

$$R^1\text{—NH—CO—O—}R^2\text{—O—CO—NH—}R^1 \qquad (I)$$

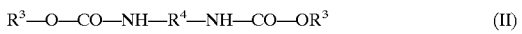

$$R^3\text{—O—CO—NH—}R^4\text{—NH—CO—O}R^3 \qquad (II)$$

wherein:
- $R^1$: represents a $C_3$–$C_{22}$ alkyl radical, a $C_7C_{22}$ aralkyl radical, preferably $C_7$–$C_{22}$ phenylalkyl or $C_8$–$C_{22}$ alkylphenyl alkyl or a phenyl radical;
- $R^2$: represents the residue of a difunctional polypropylene glycol having a number average molecular weight of from 1000 to 4000;
- $R^3$: represents the residue of a monofunctional polypropylene glycol monoalkyl (preferably $C_1$–$C_6$ monoalkyl) ether having a number average molecular weight of from 500 to 2000; and
- $R^4$: represents a $C_4$–$C_{36}$ alkylene group, a diaryl methane group, preferably diphenylmethane or ditolylmethane, or a tolylidene group;

as stabilizing additives in sealing compounds based on isocyanate-terminated prepolymers of difunctional and trifunctional polyether or polyester polyols and/or polyvinylchloride swellable copolymers of vinyl chloride with monomers from the group vinyl acetate, vinyl propionate, alkyl acrylates. These diurethanes are reaction products of monofunctional alcohols and diisocyanates. In particular, the monoalcohols are monofunctional polypropylene glycol monoalkyl ethers having a molecular weight of about 500 to 2000. These diurethanes are also suitable stabilizing agents for isocyanate-terminated polyurethane prepolymers, and for polyvinyl chloride homopolymer or copolymer plastisols. Disclosed are diurethanes prepared by reaction of diols with monoisocyanates and diurethanes prepared from symmetrical diisocyanates with polyether monoalcohols.

Moisture curing sealing and/or adhesive compositions based on alkoxysilane-terminated polyurethanes which contain diurethanes as plasticizers are described by U.S. Pat. No. 5,525,654. These diurethanes are prepared from either diol mixtures and monofunctional isocyanates wherein substantially all the free hydroxyl groups are reacted, or from diisocyanates and monofunctional alcohols wherein substantially all the free isocyanate groups are reacted.

Other urethane plasticizers are disclosed in, for example, U.S. Pat. Nos. 4,123,413 and 4,482,408. The urethane plasticizers of U.S. Pat. No. 4,123,413 correspond to one of three general formulas, and are prepared by reaction of an alcohol or a phenol with an isocyanate, from amines and chloroformates, or from chloroformamides and alcohols or phenols in the presence of acid binding agents.

The urethane plasticizer of U.S. Pat. No. 4,482,408 is octyidecylbutyl urethane and is prepared by reacting an equimolar mixture of octyidecyl isocyanate and n-butyl alcohol. This urethane plasticizer is a mono-urethane described as a straight-chain, saturated, carbamic acid ester and is suitable as a plasticizer for propellant compositions with problems of plasticizer migration which typically occur during propellant storage.

Useful diurethane plasticizers according to the present invention are based on asymmetrical diisocyanates and monoalcohols or mixtures of monoalcohols. They are prepared by either adding the alcohols to the asymmetric diisocyanates or by addition of the diisocyanates to the monofunctional alcohol(s). The diurethane plasticizers are liquid at 25° C. and usually exhibit low viscosity. The resulting diurethanes do not contain any free hydroxyl- or isocyanate-groups, and thus they are non-reactive and can be added to either isocyanates or polyols to form stable mixtures.

The use of these diurethane plasticizers in one-shot cast elastomers has several important benefits:

1) Addition to either the polyol or the isocyanate composition allows one to adjust the mix ratio very favorably, i.e., to adjust a 1:1.5 ratio to an easier to process ratio of 1:1.
2) Addition to either the polyol or the isocyanate compositions allows one to adjust the viscosities of the two components very favorably, i.e., to obtain viscosities which are similar which facilitates the mixing process.
3) Unmodified polyisocyanates that contain no urethane, allophanate, urea, or biuret groups are usually very incompatible with polyol compositions due to major differences in surface energy (i.e., polarity). Addition of the diurethane containing plasticizers according to the invention to either the polyisocyanate or both the polyisocyanate and polyol side of one-shot elastomer formulations helps to overcome these incompatibility problems and thus facilitates mixing.

Although it is possible in one-shot elastomer formulations to meter the single components separately and mix them, i.e., in a reactor or mixhead, it is preferred to combine the diurethane containing plasticizer with the polyisocyanate and/or the polyol/chain extender blend prior to mixing the isocyanate and the isocyanate reactive polyol components.

Besides the processing advantages diurethane plasticizers provide in one-shot polyurethane elastomer formulations, they do not show any substantial migration or lower the physical properties of the final polyurethane elastomer upon aging to the extent observed in state of the art non-urethane group containing plasticizers. As a result, the high performance properties of one-shot polyurethane elastomers are effected minorly upon aging when diurethane containing plasticizers are used in the formulation.

SUMMARY OF THE INVENTION

This invention relates to a process for the preparation of one-shot polyurethane cast elastomers containing liquid, diurethane non-migrating plasticizers. This process comprises reacting, via the one-shot process, (A) at least one organic polyisocyanate component,
(B) at least one isocyanate-reactive component, and
(C) at least one chain extender and/or crosslinking agent, in the presence of
(D) a liquid diurethane plasticizer having a viscosity of less than about 50,000 mPa·s, preferably less than 15,000 mPa·s, at 50° C. Suitable liquid diurethane plasticizers comprise the reaction product of:
  (1) an asymmetrical diisocyanate component having an NCO group content of about 32.0 to about 48.3%, a functionality of about 2.0, and having a viscosity of less than 1000 mPa·s at 25° C., preferably less than about 100 mPa·s; and
  (2) at least one monoalcohol having a molecular weight of about 100 to about 1,000, preferably of about 128 to about 720, and an OH number of about 56 to about 560, preferably of about 78 to about 438.

A preferred asymmetrical diisocyanate component comprises an isomeric mixture of diphenylmethane diisocyanate containing at least about 20% (preferably from 40 to 70) by weight of the 2,4'-isomer, less than about 80% (preferably about 30–60%) by weight of the 4,4'-isomer, and about 0 to about 5% (preferably no more than about 2%) by weight of the 2,2'-isomer.

DETAILED DESCRIPTION OF THE INVENTION

Suitable organic polyisocyanates for component (A) of the present process include monomeric diisocyanates, polyisocyanates, NCO prepolymers and polyisocyanate adducts. Suitable monomeric diisocyanates may be represented by the formula $R(NCO)_2$ in which R represents an organic group obtained by removing the isocyanate groups from an organic diisocyanate having a molecular weight of about 56 to 1,000, preferably about 84 to 400. Diisocyanates preferred for the process according to the invention are those represented by the above formula in which R represents a divalent aliphatic, hydrocarbon group having 4 to 12 carbon atoms, a divalent cyclo-aliphatic hydrocarbon group having 6 to 13 carbon atoms, a divalent araliphatic hydrocarbon group having 7 to 20 carbon atoms or a divalent aromatic hydrocarbon group having 6 to 18 carbon atoms. Preferred monomeric diisocyanates are those wherein R represents an aromatic hydrocarbon group.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis(4-isocyanatocyclohexyl) methane, 2,4'-dicyclohexylmethane 1,4-bis (isocyanatomethyl) cyclohexane, bis(4-isocyanato-3-methylcyclohexyl)methane, $\alpha,\alpha,\alpha',\alpha'$-tetramethyl-1,3- and/or -1,4-xylylene diisocyanate, 1-isocyanato-1-methyl-4(3)-isocyanatomethyl cyclohexane, 2,4- and/or 2,6-hexahydrotoluene diisocyanate, 1,3- and/or 1,4-phenylene diisocyanate, 2,4- and/or 2,6-toluene diisocyanate, 2,4'- and/or 4,4'-diphenylmethane diisocyanate, 1,5-diisocyanato naphthalene and mixtures thereof. Aromatic polyisocyanates containing 3 or more isocyanate groups such as 4,4',4''-triphenylmethane triisocyanate and polymethylene poly (phenylisocyanates) obtained by phosgenating aniline/formaldehyde condensates may also be used.

In accordance with the present invention, at least a portion of the polyisocyanate component may be present in the form of an NCO-terminated prepolymer or a polyisocyanate adduct. Suitable polyisocyanate adducts are those containing isocyanurate, uretdione, biuret, urethane, allophanate, carbodiimide and/or oxadiazinetrione groups. The polyisocyanate adducts have an average functionality of 2.0 to 4 and an NCO content of 5 to 30% by weight. Suitable adducts/prepolymers include the following type of components:

1) Isocyanurate group-containing polyisocyanates which may be prepared as set forth in DE-PS 2,616,416, EP-OS 3,765, EP-OS 10,589, EP-OS 47,452, U.S. Pat. No. 4,288,586 and U.S. Pat. No. 4,324,879. The isocyanato-isocyanurates generally have an average NCO functionality of 3 to 4.0, preferably of from 3.2 to 3.6, and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a, i.e., trialkyl phosphine catalyst and which may be used in admixture with other aromatic, aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906,126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as dipropylene glycol, tripropylene glycol, trimethylol propane, glycerine, 1,2-dihydroxy propane, 1,3-butanediol, neopentyl glycol, 2,2, 4-trimethyl-1,3-pentanediol, and mixtures thereof. The urethane group-containing polyisocyanates have a most preferred NCO content of 12 to 29% by weight and an (average) NCO functionality of 2.0 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 29% by weight and an (average) NCO functionality of 2 to 4.

6) Isocyanurate and allophanate group-containing polyisocyanates which may be prepared in accordance with the processes set forth in U.S. Pat. Nos. 5,124,427, 5,208,334 and 5,235,018; the disclosures of which are herein incorporated by reference.

7) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

Preferred polyisocyanate adducts are the polyisocyanates containing urethane groups, isocyanurate groups, biuret groups or mixtures of isocyanurate and allophanate groups.

The NCO-terminated prepolymers, which may also be used as the polyisocyanate component in accordance with the present invention, are prepared from the previously described polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 300 to about 5,000, preferably 400 to about 3,000, and optionally low molecular weight compounds with molecular weights below 300. The molecular weights are number average molecular weights ($M_n$) and are determined by end group analysis (OH number). Products obtained by reacting polyisocyanates exclusively with low molecular weight compounds are polyisocyanate adducts containing urethane groups and are not considered to be NCO prepolymers.

It is preferred that the polyisocyanates of the present invention are aromatic polyisocyanates. Some examples of suitable aromatic polyisocyanates are 1,3- and/or 1,4-phenylene diisocyanate, 2,4- and/or 2,6-toluene diisocyanate, 2,4'- and/or 4,4'-diphenylmethane diisocyanate, 1,5-diisocyanato naphthalene and mixtures thereof. Aromatic polyisocyanates containing 3 or more isocyanate groups such as 4,4',4''-triphenylmethane triisocyanate and polymethylene poly(phenyliso-cyanates) obtained by phosgenating aniline/formaldehyde condensates may also be used.

Suitable cycloaliphatic diisocyanates include compounds such as, for example, 4,4'-dicyclo-hexylmethane diisocyanate and isophorone diisocyanate, and mixtures thereof.

Also suitable are mixtures of polyisocyanate compositions as described above with adducts of MDI including, for example, allophanates of MDI as described in, for example, U.S. Pat. Nos. 5,319,053, 5,319,054 and 5,440,003, the disclosures of which are herein incorporated by reference; urethanes of MDI as described in, for example, U.S. Pat. Nos. 5,462,766 and 5,558,917, the disclosures of which are herein incorporated by reference; and carbodiimides of MDI as described in, for example, U.S. Pat. Nos. 2,853,473, 2,941,966, 3,152,162, 4,088,665, 4,294,719 and 4,244,855, the disclosures of which are herein incorporated by reference.

Isocyanate prepolymers including, for example, those based on diphenylmethane diisocyanate which may be based on either polyethers or polyesters are suitable for the present invention. These compounds include, for example, an isocyanate-terminated prepolymer having an NCO content of about 8 to 23%, and a functionality of about 2. Such prepolymers can be prepared by, for example, reacting 2,4'-isomer rich MDI with a difunctional polyether (prepared from propylene glycol and propylene oxide).

Suitable isocyanate-reactive components to be used as component (B) of the present invention include, for example, compounds containing at least one of the groups selected from the group consisting of hydroxy groups and amine groups, and having an average functionality of from 1 to 4, preferably from about 2 to about 3, and a molecular weight of about 500 to 10,000, preferably from about 1000 to 8000. Examples of suitable types of compounds to be used include the polyethers, polyesters, polythioethers, polyacetals, polycarbonates, and amine terminated polyethers containing from 1 to 4 isocyanate-reactive groups of the type known for the production of polyurethanes.

The high molecular weight polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Examples of suitable alcohols and amines include the low molecular weight chain extenders set forth hereinafter, propylene glycol, glycerin, ethylene glycol, triethanolamine, water, trimethylolpropane, bisphenol A, sucrose, aniline, ammonia, ethanolamine and ethylene diamine. The polyethers could contain substantial amounts of primary hydroxyl groups in terminal positions (greater than 80% by weight, based on all of the terminal hydroxyl groups present in the polyether).

Polyether polyols are preferably used as component (B) in the invention. These preferred compounds include copolymers of ethylene oxide and propylene oxide with less than 20% by weight of the oxides being ethylene oxides.

Suitable examples of high molecular weight polyesters include, for example, the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. patents. Finally, representatives of the many and varied compounds which may be used in accordance with the invention may be found, for example, in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

Component (B) is most preferably a polyether polyol.

Also suitable are so-called amine terminated polyethers containing primary or secondary (preferably primary) aromatically or aliphatically (preferably aliphatically) bound amino groups, wherein amino end groups can also be attached to the polyether chain through urethane or ester groups. These amine terminated polyethers can be prepared by any of several methods known in the art. For example, amine terminated polyethers can be prepared from polyhydroxyl polyether (e.g., polypropylene glycol ethers) by a reaction with ammonia in the presence of Raney nickel and hydrogen (Belgian Patent No. 634,741). Polyoxyalkylene polyamines can be prepared by reaction of the corresponding polyol with ammonia and hydrogen in the presence of a nickel, copper, chromium catalyst (U.S. Pat. No. 3,654,370). The preparation of polyethers containing amino end groups by the hydrogenation of cyanoethylated polyoxy-propylene ethers is described in Germany Patent 1,193,671. Other methods for the preparation of polyoxyalkylene (polyether) amines are described in U.S. Pat. Nos. 3,155,728 and 3,236,895 and in French Patent No. 1,551,605. French Patent No.1,466,708 discloses the preparation of polyethers containing secondary amino end groups. Also useful are the polyether polyamines described in U.S. Pat. Nos. 4,396,729, 4,433,067, 4,444,910 and 4,530,941.

Aminopolyethers obtained by the hydrolysis of compounds containing isocyanate end groups can be employed herein. For example, in a process disclosed in German Offenlegungsschrift 2,948,419, polyethers containing hydroxyl groups (preferably two or three hydroxyl groups) react with polyisocyanate groups and are then hydrolyzed in a second step to amino groups. Preferred amine terminated polyethers are prepared by hydrolyzing an isocyanate compound having an isocyanate group content of from 0.5 to 40% by weight. The most preferred polyethers are prepared by first reacting a polyether containing two or four hydroxyl groups with an excess of an aromatic polyisocyanate to form an isocyanate terminated prepolymer and then converting the isocyanate groups to amino groups by hydrolysis. Processes for the production of useful amine terminated polyethers using isocyanate hydrolysis techniques are described in U.S. Pat. Nos. 4,386,218, 4,456,730, 4,472,568, 4,501,873, 4,515,923, 4,525,534, 4,540,720, 4,578,500 and 4,565,645; European Patent 097,299; and German Offenlegungsschrift 2,948,419, all the disclosures of which are herein incorporated by reference. Similar products are also described in U.S. Pat. Nos. 4,506,039, 4,525,590, 4,532,266, 4,532,317, 4,723,032, 4,724,252, 4,855,504 and 4,931,595, the disclosures of which are herein incorporated by reference.

The amine terminated polyethers used in the present invention are in many cases mixtures with any of the above-mentioned compounds.

In another embodiment, the polyhydroxyl compound (B) may additionally comprise: i) a dispersion of a polyurea and/or polyhydrazo-dicarbonamide in a relatively high molecular weight organic compound containing at least two hydroxyl groups, ii) a polymer polyol prepared by polymerizing an ethylenically unsaturated monomer or monomers in a relatively high molecular weight organic compound containing at least two hydroxyl groups, or iii) blends thereof. It is possible to use these types of polyols either alone, or in conjunction with the conventional polyethers described hereinabove.

These types of polyols are known, and can be characterized as hydroxyl containing compounds which contain high molecular weight polyadducts, polycondensates, or polymers in finely dispersed or dissolved form. Such polymers may be obtained by polyaddition reactions (for example, reactions between polyisocyanates and aminofunctional compounds) and polycondensation reactions (for example, between formaldehyde and phenols and/or amines) in situ in the hydroxyl group containing compound. Such processes are described in, for example, German Auslegeschriften 1,168,075 and 1,260,142, the disclosures of which are herein incorporated by reference, and in German Offenlegungsschriften 2,324,134, 2,423,984, 2,512,385, 2,513,815, 2,550,796, 2,550,797, 2,550,833, 2,550,862, 2,633,293, and 2,639,254, the disclosures of which are herein incorporated by reference. See also U.S. Pat. Nos. 3,325,421, 4,042,537, 4,089,835, 4,293,470, 4,296,213, 4,374,209, and 4,786,706, the disclosures of which are herein incorporated by reference. Polyols of this type are commercially available from Bayer Corporation and Bayer AG. Also useful are the so-called polymer polyols obtained by polymerizing one or more ethylenically unsaturated monomers in a hydroxy group containing compound. Polyols modified by vinyl polymers, of the type formed, for example, by polymerizing styrene or acrylonitrile in the presence of polyether polyol are also suitable, as are polybutadienes containing OH groups. Such polymer polyols are described in U.S. Pat. Nos. 3,383,351, 3,304,273, 3,523,093, 3,110,685, and RE 28,715 and 29,118, and German Patent 1,152,536, the disclosures of which are herein incorporated by reference. Polymer polyols are commercially available from Bayer AG, BASF, and Union Carbide.

The preferred PHD polyols include, for example, the polyurea of toluene diisocyanate and hydrazine dispersed in polyether polyol, and the preferred polymer polyols include, for example, those based on the monomers styrene and acrylonitrile.

In addition to the isocyanate-reactive component (B), the present invention generally requires (C) at least one chain extender and/or crosslinking agent that may contain hydroxyl groups, amine groups, or both, be present as a portion of the isocyanate-reactive component. Suitable relatively low molecular weight compounds generally have molecular weights of from about 60 to less than 500, and contain from 1 to 3, preferably about 2 isocyanate-reactive groups.

Suitable organic chain extenders and/or crosslinking agents according to the invention include, for example, diols and triols such as, for example, 2-methyl-1,3-propanediol, ethylene glycol, 1,2- and 1,3-propanediol, 1,3- and 1,4- and 2,3-butane-diol, 1,6-hexane-diol, 1,10-decanediol, diethylene glycol, triethylene glycol, tetraethylene glycol, dipropylene glycol, tripropylene glycol, neopentyl glycol, cyclohexanedimethanol, 2,2,4-trimethylpentane-1,3-diol, trimethylol propane, 1,4-ethoxy(β-hydroxybenzene), and mixtures thereof. Preferred diols include, for example, 1,4-butanediol, ethylene glycol, diethylene glycol, trimethylol propane, 1,4-ethoxy(β-hydroxybenzene), and mixtures thereof.

Suitable aminoalcohols to be used as crosslinking agents include, for example, monoisopropanolamine, monoethanolamine, etc.

Suitable amine compounds to be used as crosslinking agents in accordance with the invention include organic primary amines and secondary amines such as, for example, 2-methyl-1,5-pentane diamine, ethylene diamine, 1,3-diamino-propane, 1,3-diaminobutane, 1,4-diamino-butane, isophorone-diamine, diamino-cyclohexane, hexamethylenediamine, methyliminobis-(propyl-amine), iminobis(propyl-amine), bis(aminopropyl)piperazine, aminoethyl piperazine, bis-(p-aminocyclohexyl)-methane, mixtures thereof, and the like.

Other suitable amines include, for example, bis(4-amino-3-methylcyclohexyl)methane, bis(4-amino-3,5-dimethylcyclohexyl)methane, bis(4-amino-2,3,5-trimethylcyclohexyl)-methane, 1,1-bis(4-aminocyclohexyl)propane, 2,2-bis(4-aminocyclo-hexyl)propane, 1,1-bis(4-aminocyclohexyl)ethane, 1,1-bis(4-aminocyclo-hexyl)butane, 2,2-bis(4-aminocyclohexyl)butane, 1,1-bis(4-amino-3-methylcyclohexyl)ethane, 2,2-bis(4-amino-3-methylcyclohexyl)propane, 1,1-bis(4-amino-3,5-dimethylcyclohexyl)ethane, 2,2-bis(4-amino-3,5-dimethylcyclohexyl)-propane, 2,2-bis(4-amino-3,5-dimethylcyclohexyl)-butane, 2,4-diaminodicyclohexylmethane, 4-aminocyclohexyl-4-amino-3-methylcyclohexylmethane, 4-amino-3,5-dimethylcyclohexyl-4-amino-3-methylcyclohexylmethane, and 2-(4-aminocyclohexyl)-2-(4-amino-3-methylcyclohexyl)methane.

It is also possible to use the so-called amine-terminated polyethers having low molecular weights. The suitable amine terminated polyethers include, for example, those containing primary or secondary, aromatically or aliphatically bound amino groups, wherein amino end groups can also be attached to the polyether chain through urethane or ester groups. Suitable compounds include, for example, Jeffamine D400 and Jeffamine D-230, which are commercially available from Huntsman Chemical Corporation.

These low molecular weight amine-terminated polyethers can be prepared by any of several methods known in the art. For example, amine-terminated polyethers can be prepared from polyhydroxyl polyether (e.g., polypropylene glycol ethers) by a reaction with ammonia in the presence of Raney nickel and hydrogen (Belgian Patent No. 634,741). Polyoxyalkylene polyamines can be prepared by reaction of the corresponding polyol with ammonia and hydrogen in the presence of a nickel, copper, or chromium catalyst (U.S. Pat. No. 3,654,370). The preparation of polyethers containing amino end groups by the hydrogenation of cyanoethylated polyoxypropylene ethers is described in Germany Patent 1,193,671. Other methods for the preparation of polyoxyalkylene (polyether) amines are described in U.S. Pat. Nos. 3,155,728 and 3,236,895 and in French Patent No. 1,551,605. French Patent No. 1,466,708 discloses the preparation of polyethers containing secondary amine end groups. Also useful are the polyether polyamines described in U.S. Pat. Nos. 4,396,729, 4,433,067, 4,444,910 and 4,530,941.

Other suitable amines to be used for the crosslinking agent, i.e., component (C) in the present invention include, for example, aromatic diamines such as, for example, 1-methyl-3,5-diethyl-2,4-diamino benzene (i.e., DETDA), 1-methyl-3,5-diethyl-2,6-diamino benzene (i.e., DETDA), 1,3,5-trimethyl-2,4-diamino benzene, 1,3,5-triethyl-2,4-diamino benzene, 3,5,3',5'-tetraethyl-4,4'-diamino diphenylmethane, 3,5,3', 5'-tetraisopropyl-4,4'-diamino diphenylmethane, 3,5-diethyl-3',5'-diisopropyl-4,4'-diamino diphenyl-methane, 3,3'-diethyl-5,5'-diisopropyl-4,4'-diamino diphenyl-methane, 1-methyl-2,6-diamino-3-isopropylbenzene, 1-methyl-3,5-dithioethyl-2,4-diamino benzene and/or 1-methyl-3,5-dithioethyl-2,6 diamino benzene (ETHACURE 300), and mixtures of the above diamines, such as, for example, mixtures of 1-methyl-3,5-diethyl-2,4-diamino benzene and 1-methyl-3,5-diethyl-2,6-diamino benzene.

Preferred compounds containing amine groups to be used in the present invention as crosslinking agents include monoethanolamine, DETDA, and ETHACURE 300.

It is also possible that the low-molecular weight crosslinking agents include at least one organic crosslinker such as, for example, organic polyols and/or organic amines containing greater than 2 isocyanate-reactive groups, preferably 3 isocyanate-reactive groups. Examples of such compounds include, for example, diethanolamine, triethanolamine, trimethylolpropane, glycerol, diisopropanolamine, mixtures thereof, and the like. Low molecular weight alkoxylated polyols of the above mentioned starter compounds are also suitable crosslinkers.

In accordance with the present invention, component (D) comprises a liquid diurethane plasticizer having a viscosity of less than about 50,000 mPa·s, preferably less than about 15,000 mPa·s, at 50° C. Suitable liquid diurethane plasticizers for the present invention comprise the reaction product of (1) an asymmetrical diisocyanate component having an NCO group content of about 32.0 to about 48.3%, a functionality of about 2.0, and a viscosity of less than about 1000 mPa·s at 250° C.; and (2) at least one monoalcohol having a molecular weight of about 100 to about 1,000 and having an OH number of about 56 to about 560.

Liquid diurethane plasticizers can be prepared by several means. The so-called "standard method" of addition can be used, wherein the monoalcohol component is added to the asymmetrical diisocyanate.

Another method of preparing the liquid diurethane plasticizers for component (D) of the present invention is the so-called "reverse-method" of addition wherein the isocyanate component is added to the monoalcohol.

Suitable asymmetrical diisocyanates for forming the liquid diurethane plasticizers of the present invention include those having an NCO group content of about 32.0 to about 48.3%, a functionality of about 2.0, and a viscosity of less than about 1000 mPa·s, preferably less than about 100 mPa·s at 25° C. It is, of course, possible to use mixtures of various asymmetrical diisocyanates for forming the liquid diurethane plasticizers of the present invention. Mixtures of an asymmetrical diisocyanate which satisfies the above requirements for NCO group content, functionality, and viscosity with a symmetrical diisocyanate are also suitable for the present invention provided that they contain a minimum of 20% of asymmetrical diisocyanates.

As used herein, the phrase "asymmetrical diisocyanate" means a diisocyanate which does not have an axis of symmetry, i.e., it can not be cut into two equal parts that have the same chemical structure which are mirror images of each other.

Some examples of suitable diisocyanates to be used in the present invention include diisocyanates such as isomeric mixtures of 2,4'-diphenylmethane diisocyanate and 4,4'-diphenylmethane diisocyanate, isomeric mixtures of 2,4'-dicyclohexylmethane diisocyanate and 4,4'-dicyclohexylmethane diisocyanate and steric isomers, isophorone diisocyanate, and isomeric mixtures of 2,4-toluene diisocyanate and 2,6-toluene diisocyanate, etc. The preferred asymmetrical diisocyanates for the present invention are isomeric mixtures of 2,4'- and 4,4'-diphenylmethane diisocyanate, steric isomeric mixtures of 4,4'-dicyclohexylmethane and isophorone diisocyanate.

A particularly preferred asymmetrical diisocyanate component comprises an isomeric mixture of diphenylmethane diisocyanate containing at least about 20% (preferably from 40 to 70) by weight of the 2,4'-isomer, less than about 80% (preferably about 30 to 60%) by weight of the 4,4'-isomer, and about 0 to about 5% (preferably about 2%) by weight of the 2,2'-isomer.

Suitable monoalcohols for forming the liquid diurethane plasticizers of the present invention include those having a molecular weight of about 100 to about 1,000, preferably of about 128 to about 720, and an OH number of about 56 to about 560, preferably of about 78 to about 438.

Suitable monoalcohols include linear alkyl alcohols, branched alkyl alcohols, alkoxylated products of alkyl alcohols and alkyl ester alcohols.

Some examples of suitable monoalcohols include compounds such as 1-hexanol, 1-heptanol, 1-octanol, 1-nonanol, 1-decanol, 1-dodecanol, 2-ethyl-1-hexanol, 3,5,5-trimethyl-1-hexanol, 2-ethyl-1-heptanol, 2-ethyl-1-octanol, linear and branched $C_9$ to $C_{19}$ alcohols and mixtures thereof; alkoxylation products containing from 1 to 15 carbon atoms, from 3 to 12 alkoxy groups and containing 1 hydroxyl group, such as, for example, ethoxylation and/or propoxylation adducts of linear primary alcohols containing from 12 to 15 carbon atoms such as, for example, 1-dodecanol, 1-tridecanol, 1-tetradecanol, 1-pentadecanol, and mixtures thereof; alkyl ether alcohols such as, for example, 2,2,4-trimethyl-1,3-pentanediol monoisobutyrate. Also, mixtures of alkoxylation adducts of an alkylene oxide and a monoalcohol compound containing from 1 to 15 carbon atoms with a monoalcohol compound having a molecular weight of 100 to 1,000 and from 5 to 19 carbon atoms are suitable for component (D)(2) of the present invention.

The preparation of the one-shot polyurethane elastomer described in the present invention involves either separate metering of the four compounds, or combining components (A) and (D), and/or (B) and (D), and/or (B), (C) and (D)

prior to mixing. Although it is possible in one-shot elastomer formulations to meter the single components separately and mix them, i.e., in a reactor or mixhead, it is preferred to combine the diurethane containing plasticizer with the polyisocyanate and/or the polyol/chain extender blend prior to mixing the isocyanate and the isocyanate reactive polyol components.

The one-shot polyurethane cast elastomer of the present invention contains from 5 to 90%, preferably 10 to 50%, of the liquid diurethane plasticizer, component (D). The NCO:OH equivalent ratio of the organic polyisocyanate component (A) to the sum of the isocyanate-reactive component (B) and chain-extenders and/or crosslinking agents (C) is from 0.90:1 to 1.10:1, preferably from 1.01:1 to 1.05:1.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The following compounds were used in the examples:

Isocyanate A: an isomeric mixture of diphenylmethane diisocyanate having an NCO group content of about 33.6% and containing about 55% by weight of the 2,4'-isomer and about 45% by weight of the 4,4'-isomer Isocyanate B: 4,4'-diphenylmethane diisocyanate having an NCO group content of about 33.6%

Isocyanate C: 1,6-hexamethylene diisocyanate having an NCO group content of about 50.0%

Isocyanate D: a steric isomeric mixture of 4,4'-dicyclohexylmethane diisocyanate having an NCO group content of about 32.0%

Isocyanate E: 3-isocyanatomethyl-3,5,5-trimethylcyclohexylisocyanate having an NCO group content of about 37.8%

Isocyanate F: an isomeric mixture of 2,4-toluene diisocyanate and 2,6-toluene diisocyanate in an 80:20 wt. ratio, having an NCO group content of about 48.3%

Monoalcohol A: a 12 mole ethoxylate of a mixture of $C_{12}$–$C_{15}$ linear primary alcohols, having an OH number of 78, a molecular weight of 719, a water content of 0.01% and an EO:OH weight ratio of 11.7:1, and which is a solid Monoalcohol B: a 3 mole ethoxylate of a mixture of $C_{12}$–$C_{13}$ linear primary alcohols, having an OH number of 177, a molecular weight of 317, a water content of 0.01% and an EO:OH weight ratio of 2.79:1, and which is a liquid Monoalcohol C: 2-ethyl-1-hexanol, having a molecular weight of 128, and which is a liquid Monoalcohol D: isostearyl alcohol, having a molecular weight of 291, and which is a liquid Monoalcohol E: 2,2,4-trimethyl-1,3-pentanediol monoisobutyrate, having a molecular weight of 216, and which is a liquid Isocyanates B and C are symmetrical diisocyanates and were used for comparative purposes.

Preparation of Liquid Diurethane Plasticizers

Liquid diurethane plasticizers can be prepared by several means. The so-called "standard method" of addition can be used, wherein the monoalcohol component is added to the asymmetrical diisocyanate component in a 3-necked flack, which is equipped with a stirrer and blade, a thermocouple to read reaction temperatures, a nitrogen inlet, and a water absorbing drying tube. A charge of 8 to 60% by weight of the asymmetrical diisocyanate, based on the total weight of the asymmetrical diisocyanate and the monoalcohol(s), at ambient temperature is added to the 3-necked flask. Higher temperatures may be necessary here if the starting diisocyanate is a solid. The agitator is started and a nitrogen purge is applied to the flask. Then, from 40 to 92% of the monoalcohol(s), based on the total weight of the monoalcohol(s) and asymmetrical diisocyanate, at ambient temperature is charged to the flask as fast as possible while maintaining the reaction temperature below 80° C. Higher temperatures for charging the monoalcohol(s) may also be necessary if these are solid materials. Cooling is applied to the flask if needed to maintain the reaction temperature below 80° C. The reaction mixture in the flask is stirred while maintaining the temperature at 80° C. until the reaction is complete, typically for about 3 to 5 hours, as indicated by the absence of any isocyanate. This can be readily determined or tested by using isocyanate indicating paper.

Another method of preparing the liquid diurethane plasticizers for component (D) of the present invention is the so-called "reverse-method" of addition wherein the isocyanate component is added to the monoalcohol component in a 3-necked flask, which is equipped with a stirrer and blade, a thermocouple to read reaction temperatures, a nitrogen inlet, and a water absorbing drying tube. First, a charge of 40 to 92% by weight of the monoalcohol(s), based on the total weight of monoalcohol(s) and the asymmetrical diisocyanate, is added to the 3-necked flask at ambient temperature or a higher temperature if the monoalcohol(s) is(are) solid(s). The agitator is started and a nitrogen purge is applied to the flask. Next, a charge of from 8 to 60% by weight of the asymmetrical diisocyanate, based on the total weight of the monoalcohol(s) and the asymmetrical diisocyanate, at ambient temperature (or higher temperatures when the diisocyanate is a solid) is added to the flask as fast as possible while maintaining the reaction temperature below 80° C. Cooling is applied to the flask if needed to maintain the reaction temperature below 80° C. The reaction mixture in the flask is stirred while maintaining the temperature at 80° C. until the reaction is complete, typically for about 3 to 5 hours, as indicated by the absence of any isocyanate. This can be readily determined or tested by using isocyanate indicating paper.

Liquid diurethane plasticizers in Examples 1, 4, 8, 10, 12, and 14 in Table 1 were prepared via the standard method of addition as described above. In accordance with this method, the monoalcohol (at 25° C.) was added to the isocyanate (at 25° C.) as fast as possible while the reaction temperature was maintained between 25 and 80° C., and cooled as needed. Then, the reaction mixture was heated to 80° C. and maintained at that temperature from 3 to 5 hours, until the mixture was free of isocyanate as determined by isocyanate indicator paper.

Examples 3, 5 and 6 in Table 1 used the same procedure, except that the monoalcohol and the isocyanate were preheated to 50° C., and the temperature was controlled and maintained to between 50 and 80° C. during the addition step.

Liquid diurethane plasticizers in Examples 2, 9, 11, 13, 15, 16 and 17 in Table 1 were prepared via the reverse method of addition as described above. In accordance with this method, the isocyanate (at 25° C.) was added to the monoalcohol (at 25° C.) as fast as possible while the reaction temperature was maintained between 25 and 80° C., and cooled as needed. Then, the reaction mixture was heated to 80° C. and maintained at that temperature from 3 to 5 hours, until the mixture was free of isocyanate as determined by isocyanate indicator paper.

Example 7 in Table 1 used the same procedure, except that the monoalcohol and the isocyanate were preheated to 50° C., and the temperature was controlled and maintained to between 50 and 80° C. during the addition step.

and then degassed in a vacuum heating oven at 25 to 80° C. until free of bubbles. A pre-degassed, weighed amount of an organic polyisocyanate component (A) is then added to the above mentioned vessel and stirred for 30 to 60 seconds. The reaction mixture is then poured into a steel mold (pre-heated at 25 to 80° C.). The elastomer is removed from the mold in ca. 15 minutes to 4 hours, and placed in an 80–110° C. oven for 16 hours. After the elastomers are stored at 25° C. for 5 days, elastomer properties are determined.

The following components were used in the preparation of polyurethane cast elastomers:

TABLE 1

LIQUID DIURETHANE PLASTICIZERS (D)

| Example | Iso | Monoalcohol | NCO:OH ratio | Appearance at 25° C. | Viscosity (mPa · s) | % Iso | % Monoalcohol A | % Monoalcohol B | Type addition |
|---|---|---|---|---|---|---|---|---|---|
| Example 1 | A | B | 1.0 | Liquid | 11,500 at 50° C. | 28.28 | 71.72 | — | Std. |
| Example 2 | A | B | 1.0 | Liquid | 4,751 at 25° C. | 28.28 | 71.72 | — | Rev. |
| Example 3 | A | A | 1.0 | Liquid | 1,476 at 25° C. | 14.81 | 85.19 | — | Std. |
| Example 4 | A | C:B | 1.0 | Liquid | 14,970 at 25° C. | 35.98 | 18.41 | 45.61 | Std. |
| Example 5 | A | C:A | 1.0 | Liquid | 2,916 at 25° C. | 22.79 | 11.56 | 65.55 | Std. |
| Example 6* | B | B | 1.0 | Solid | — | 28.28 | 71.72 | — | Std. |
| Example 7* | B | B | 1.0 | Solid | — | 28.28 | 71.72 | — | Rev. |
| Example 8* | C | B | 1.0 | Solid | — | 20.95 | 79.05 | — | Std. |
| Example 9* | C | B | 1.0 | Solid | — | 20.95 | 79.05 | — | Rev. |
| Example 10 | D | B | 1.0 | Liquid | 13,160 at 25° C. | 29.24 | 70.76 | — | Std. |
| Example 11 | D | B | 1.0 | Liquid | 3,600 at 25° C. | 29.24 | 70.76 | — | Rev. |
| Example 12 | E | B | 1.0 | Liquid | 1,740 at 25° C. | 25.93 | 74.07 | — | Std. |
| Example 13 | E | D | 1.0 | Liquid | 9,460 at 25° C. | 27.63 | 72.37 | — | Rev. |
| Example 14 | F | B | 1.0 | Liquid | 2,870 at 25° C. | 21.53 | 78.47 | — | Std. |
| Example 15 | F | B | 1.0 | Liquid | 2,500 at 25° C. | 21.53 | 78.47 | — | Rev. |
| Example 16 | F | E | 1.0 | Liquid | 6,400 at 50° C. | 28.68 | 71.32 | — | Rev. |
| Example 17 | F | C | 1.0 | Liquid | 1,950 at 50° C. | 40.46 | 59.54 | — | Rev. |

*Examples 6–9 are comparative examples which were based on symmetrical diisocyanates.

Preparation of One-Shot Polyurethane Cast Elastomers

The preparation of the one-shot polyurethane cast elastomer described in the present invention involves mixing an organic polyisocyanate component (A), at 25 to 80° C., with an isocyanate-reactive component (B), at 25 to 80° C., and a chain extender and/or crosslinking agent (C) at 25 to 80° C., and a non-reactive liquid diurethane plasticizer (D) at 25 to 80° C. The process may also be a three stream reaction, when the isocyanate-reactive component and the chain extender and/or crosslinking agent (C) are pre-mixed.

It is also possible that the plasticizer (D) can be premixed with the polyisocyanate component (A), or with the isocyanate-reactive component (B), or the mixture of (B) and (C), in the process scheme. Plasticizer can also be premixed with both the polyisocyanate component (A) and the isocyanate-reactive components (B) and/or (C).

The latter process is described in the following hand cast procedure and was used to prepare the elastomers in Table 2: The isocyanatereactive component (B), the chain extender and/or crosslinking agent (C), and the non-reactive, liquid diurethane plasticizer (D) are weighed into a suitable vessel Isocyanate G: a modified diphenylmethane diisocyanate terminated polyether prepolymer based on polypropylene glycol, and having an NCO group content of about 21.7%

Polyol A: a glycerine initiated polypropylene oxide polyethylene oxide (87:13 wt. ratio) polyether polyol having an OH number of 28 and a functionality of 3

Diol A: 1,4-butanediol

The following formulation was used to prepare the one-shot polyurethane cast elastomers in Table 2:

Isocyanate G: 104.1 parts by weight
Polyol A: 172.7 parts by weight
Diol A: 19.2 parts by weight
Plasticizer 74.2 parts by weight In the above formulation, the plasticizer was varied as shown in Table 2 below to demonstrate the non-migrating properties of the diurethane plasticizers of the present invention vs. conventional plasticizers such as, for example, dioctyl phthlate (DOP). Dioctyl phthlate is a non-urethane plasticizer which is commonly used in one-shot polyurethane cast elastomers. The blend of Polyol A, Diol A and Plasticizer contained 20 ppm of dibutyltin dilaurate catalyst (based on the combined weight of Polyol A, Diol A and Plasticizer).

The physical properties of the one-shot polyurethane cast elastomers are shown in Table 3 below.

The degree of migration of the diurethane plasticizers of the present invention and of the non-urethane plasticizer (dioctyl phthlate) in a one-shot elastomer formulation were determined and are set forth in Table 4 below. To determine the migration rate, we used an extraction method as an accelerated test on the plasticizer containing polyurethane elastomers. A 4"×1×⅛" section of the polyurethane elastomer was weighed and placed in a tube of a soxlet extractor. The elastomer was extracted with xylene for 1 hour. The sample was then left overnight at room temperature and then placed in a vacuum dessicator for 3 hours to remove any excess xylene. The dried sample was reweighed and the percent loss of plasticizer was determined.

Non-migrating plasticizers are defined as those plasticizers that lose less than 50% by weight, based on the weight of plasticizer present in a polyurethane cast elastomer under the extraction method conditions described above.

TABLE 2

Diurethane Plasticizer Containing One-Shot Polyurethane Cast Elastomers

| Example | Plasticizer | Cast Temperature | Pot Life (minutes) | Post Cure Conditions |
|---|---|---|---|---|
| Example 18 | Dioctyl Phthlate | 25° C. | 10 minutes | 16 hours at 100° C. |
| Example 19 | Example 3 of Table 1 | 50° C. | 1 minute 45 seconds | 16 hours at 100° C. |
| Example 20 | Example 11 of Table 1 | 40° C. | 1 minute 15 seconds | 16 hours 100° C. |
| Example 21 | Example 13 in Table 1 | 50° C. | 1 minute 45 seconds | 16 hours at 100° C. |

TABLE 3

Elastomer Properties

| Example | Shore A Hardness | Modulus, 100% (psi) | Modulus, 300% (psi) | Tensile strength (psi) | Elongation (%) | Elongation Set (%) | Tear Die C (pli) | Bayshore Rebound (%) |
|---|---|---|---|---|---|---|---|---|
| Example 18 | 62 | 400 | 1,050 | 1200 | 340 | 10 | 70 | 60 |
| Example 19 | 48 | 225 | — | 200 | 100 | 1 | 30 | 36 |
| Example 20 | 46 | 225 | — | 400 | 280 | 13 | 70 | — |
| Example 21 | 59 | 336 | 890 | 1270 | 420 | 20 | 100 | 50 |

TABLE 4

Plasticizer Migration Properties
(as determined by xylene extraction)

| Example | Plasticizer from Table 1 | Plasticizer Migration (% loss by weight*) |
|---|---|---|
| Example 18 | Dioctyl Phthlate | 70% |
| Example 19 | Example 3 | 31% |
| Example 20 | Example 11 | 32% |
| Example 21 | Example 13 | 26% |

*based on the total amount of plasticizer

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of one-shot polyurethane cast elastomers containing liquid, diurethane non-migrating plasticizers, comprising reacting via the one-shot process
   (A) at least one organic polyisocyanate component,
   (B) at least one isocyanate-reactive component, and
   (C) at least one chain extender and/or crosslinking agent, in the presence of
   (D) a liquid diurethane plasticizer having a viscosity of less than about 50,000 mPa·s at 50° C., and comprising the reaction product of:
      (1) an asymmetrical diisocyanate component having an NCO group content of about 32.0 to about 48.3%, a functionality of about 2.0, a viscosity of less than about 1000 mPa·s at 25° C., and comprising diphenylmethane diisocyanate having an isomer distribution of at least about 20% by weight of the 2,4'-isomer, less than 80% by weight of the the 4,4'-isomer, and about 0 to 5% by weight of the 2,2'-isomer; and
      (2) at least one monoalcohol having a molecular weight of about 100 to about 1,000 and an OH number of about 56 to about 560.

2. The process of claim 1, wherein (D) said liquid diurethane plasticizer has a viscosity of less than 15,000 mPa·s at 50° C.

3. The process of claim 1, wherein (D) said liquid diurethane plasticizer comprises the reaction product of
   (1) an asymmetrical diisocyanate component having a viscosity of less than about 100 mPa·s at 25° C.; and
   (2) at least one monoalcohol having a molecular weight of about 128 to about 720 and an OH number of about 78 to about 438.

4. The process of claim 1, wherein (D)(1) said diphenylmethane diisocyanate has an isomer distribution of from about 40 to about 70% by weight of the 2,4'-isomer, from about 30 to about 60% by weight of the 4,4'-isomer, and no more than about 2% by weight of the 2,2'-isomer.

5. The process of claim 1, wherein (D)(2) said monoalcohols are free of ether groups.

6. The process of claim 1, wherein (A) said organic polyisocyanate component comprises an aromatic polyisocyanate, an NCO-terminated prepolymer of an aromatic polyisocyanate, or a mixture thereof.

7. The process of claim 1, wherein (B) said isocyanate-reactive component comprises a polyether polyol.

8. The process of claim 1, wherein (C) said chain extender and/or crosslinking agent contains hydroxyl groups, amine groups or both, and has a molecular weight of from about 60 to less than 500, and contains from 1 to 3 isocyanate-reactive groups.

9. The process of claim 1, wherein (D) said liquid diurethane plasticizer is prepared by adding (1) an asymmetrical diisocyanate to (2) a monoalcohol.

10. The process of claim 1, wherein (D) said liquid diurethane plasticizer is prepared by adding (2) a monoalcohol to (1) an asymmetrical diisocyanate.

11. The process of claim 1, wherein the isocyanate index is from 90 to 110.

12. The one-shot polyurethane cast elastomer containing a liquid, diurethane non-migrating plasticizer produced by the process of claim 1.

13. A process for the preparation of one-shot polyurethane cast elastomers containing liquid, diurethane non-migrating plasticizers, comprising reacting via the one-shot process (A) at least one organic polyisocyanate component, (B) at least one isocyanate-reactive component, and (C) at least one chain extender and/or crosslinking agent, in the presence of (D) a liquid diurethane plasticizer having a viscosity of less than about 50,000 mPa·s at 50° C., and comprising the reaction product of:

(1) an asymmetrical diisocyanate component having an NCO group content of about 32.0 to about 48.3%, a functionality of about 2.0, and a viscosity of less than about 1000 mPa·s at 25° C.; and (2) at least one monoalcohol having a molecular weight of about 100 to about 1,000 and an OH number of about 56 to about 560, and which is free of ether groups.

14. The process of claim 13, wherein (D) said liquid diurethane plasticizer has a viscosity of less than 15,000 mPa·s at 50° C.

15. The process of claim 13, wherein (D) said liquid diurethane plasticizer comprises the reaction product of (1) an asymmetrical diisocyanate component having a viscosity of less than about 100 mPa·s at 25° C.; and (2) at least one monoalcohol having a molecular weight of about 128 to about 720 and an OH number of about 78 to about 438, and which is free of ether groups.

16. The process of claim 13, wherein (D)(1) said asymmetrical diisocyanate is selected from the group consisting of (i) diphenylmethane diisocyanate comprising a mixture of the 2,2'-, the 2,4'- and the 4,4'-isomers, and (ii) toluene diisocyanate comprising a mixture of the 2,4- and the 2,6-isomers.

17. The process of claim 13, wherein (D)(1) said asymmetrical diisocyanate comprises diphenylmethane diisocyanate having an isomer distribution of at least about 20% by weight of the 2,4'-isomer, less than about 80% by weight of the 4,4'-isomer, and about 0 to 5% by weight of the 2,2'-isomer.

18. The process of claim 13, wherein (D)(1) said asymmetrical diisocyanate comprises diphenylmethane diisocyanate having an isomer distribution of from about 40 to about 70% by weight of the 2,4'-isomer, from about 30 to about 60% by weight of the 4,4'-isomer, and no more than about 2% by weight of the 2,2'-isomer.

19. The process of claim 13, wherein (A) said organic polyisocyanate component comprises an aromatic polyisocyanate, an NCO-terminated prepolymer of an aromatic polyisocyanate, or a mixture thereof.

20. The process of claim 13, wherein (B) said isocyanate-reactive component comprises a polyether polyol.

21. The process of claim 13, wherein (C) said chain extender and/or crosslinking agent contains hydroxyl groups, amine groups or both, and has a molecular weight of from about 60 to less than 500, and contains from 1 to 3 isocyanate-reactive groups.

22. The process of claim 13, wherein (D) said liquid diurethane plasticizer is prepared by adding (1) an asymmetrical diisocyanate to (2) a monoalcohol.

23. The process of claim 13, wherein (D) said liquid diurethane plasticizer is prepared by adding (2) a monoalcohol to (1) an asymmetrical diisocyanate.

24. The process of claim 13, wherein the isocyanate index is from 90 to 110.

25. The one-shot polyurethane cast elastomer containing a liquid, diurethane non-migrating plasticizer produced by the process of claim 13.

* * * * *